Figure 7:
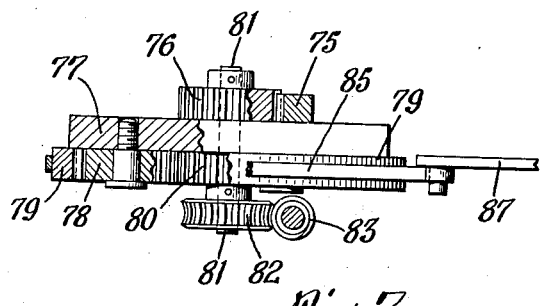

June 28, 1949.  J. M. KEIR ET AL  2,474,531
METHOD OF AND APPARATUS FOR ELECTRICALLY
WELDING STUDS TO SURFACES
Filed April 7, 1944  2 Sheets-Sheet 1
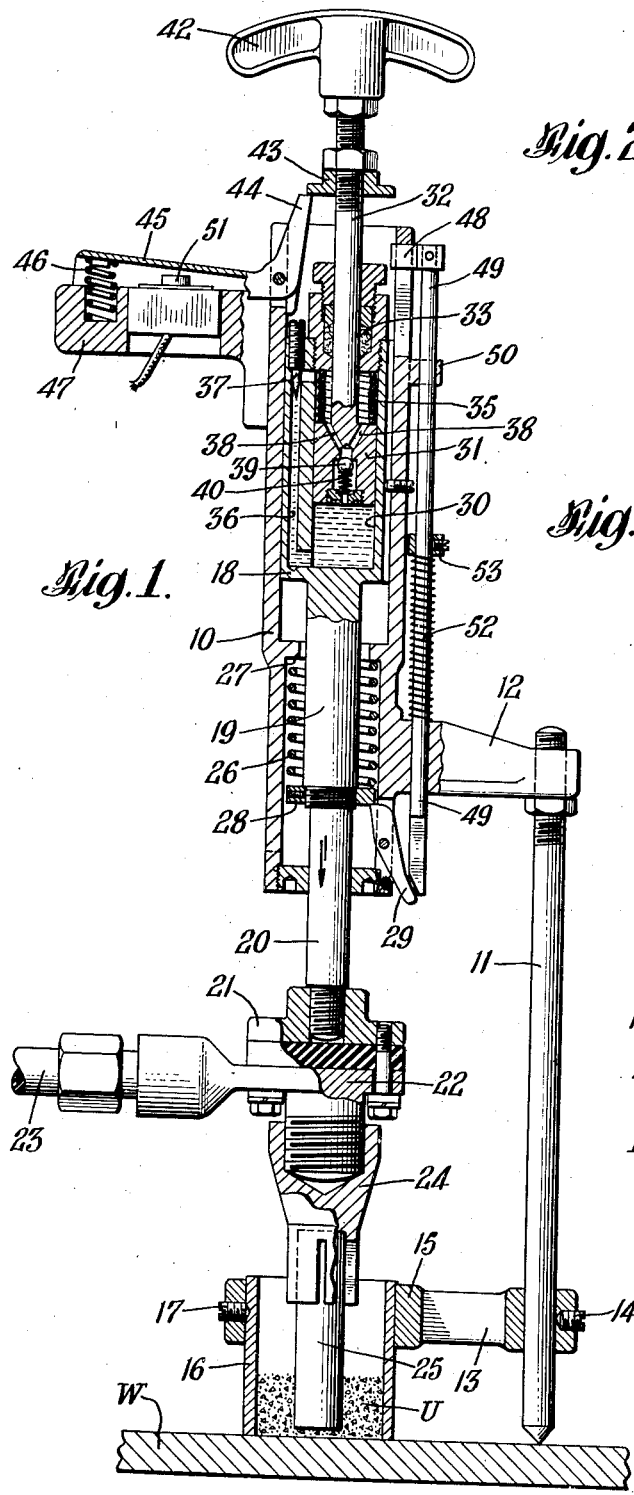
INVENTORS
JAMES M. KEIR
EDWIN A. CLAPP
BY
*Greenewald*
ATTORNEY June 28, 1949.  J. M. KEIR ET AL  2,474,531
METHOD OF AND APPARATUS FOR ELECTRICALLY
WELDING STUDS TO SURFACES
Filed April 7, 1944                                       2 Sheets-Sheet 2

INVENTORS
JAMES M. KEIR
EDWIN A. CLAPP
BY
ATTORNEY

Patented June 28, 1949

2,474,531

UNITED STATES PATENT OFFICE 2,474,531

METHOD OF AND APPARATUS FOR ELECTRICALLY WELDING STUDS TO SURFACES

James M. Keir, Bronxville, and Edwin A. Clapp, Niagara Falls, N. Y., assignors to The Linde Air Products Company, a corporation of Ohio Application April 7, 1944, Serial No. 529,930

11 Claims. (Cl. 219—4)

This invention relates to welding studs to surfaces, and more particularly to method of and apparatus of this character, employing blanketed electric welding.

In metal fabrication there are many instances in which it is desirable to weld studs or upstanding bars or rods to flat surfaces. In shipbuilding, for example, this expedient is employed to secure deck planking to the steel deck, and in machine construction to secure various smaller casings or sub-frames to a main casing or frame. Much use has been made of resistance welding for this purpose, but such installations are costly and lack flexibility.

Blanketed electric welding is a process using the heat generated by the passage of a very heavy electric current from a bare fusible metal electrode to the work being welded, the end of the electrode being constantly covered or blanketed by a deep layer of a welding medium consisting principally of granulated refractory mineral-like material that is substantially electrically non-conductive when cold and is a high-resistance electrical conductor when molten. This granulated material is laid down in a deep layer on the adjacent edges or surfaces of the workpieces to be welded and the entire welding action takes place beneath it without an open visible arc and with little or no spatter, smoke or flash. Within the layer of granulated material an intense, concentrated heat is generated by the electric current, and in the welding zone so established portions of the electrode, welding medium, and metal of the workpieces are melted. Molten metal from the electrode is thoroughly mixed with the melting metal of the workpieces to form the weld. When a weld is being made a sub-surface layer of the granulated material melts and floats as a liquid blanket over the molten weld metal. This molten refractory material cools and solidifies and then is readily detached from the weld.

The granular refractory material used in the invention may have a wide variety of compositions. The material should be of such a nature that it can be fused by welding heat. Suitably it has a melting point not substantially higher than that of the metal to be welded, and is substantially free from gas-forming or other ingredients harmful to the weld. Preferably the material consists chiefly of silicates of the alkaline earth metals and magnesium, substantially free from uncombined iron oxides. Metallic silicates may also be included as an ingredient, particularly manganese silicate. Fluidifiers may be added if desired. It is also preferred that the ingredients of the material be mixed, prefused to complete chemical reactions between the ingredients, and subsequently crushed or ground to the desired size.

Heretofore, since the granulated welding medium is not a conductor of electricity when it is cold, a special fuse, such as a wad of steel wool, has been used to start the weld. Such fuse was covered with granulated material and, when the welding current was turned on, the fuse became sufficiently hot to melt the adjacent layer of granulated material to permit the welding operation to continue, the granulated material being progressively fused by the heat generated as the welding proceeded.

Alternatively, iron powder may be mixed with the granulated material, and the mixture interposed between the electrode and the surface, the welding current passing through the mixture and fusing it. Ordinarily, the steel wool or iron powder mixture may be inserted underneath the electrode by hand each time the welding process is started, but for rapid repetitive and automatic starting by this method mechanical feeding of the starting material is contemplated.

Alternatively, the electrode may be pointed, and the point penetrated through the granular material to start the flow of welding current. Also, a high-frequency voltage may be applied across the gap between the electrode and the work and through the intervening granular mineral material, the high-frequency voltage being of sufficient value to establish a high-frequency discharge path between the rod and work. The welding current then flows along the path so established. Thus, this starting expedient is characterized by the use of an auxiliary high-frequency current in addition to the welding current, the flow of the latter being started by the ionization of a path through a layer of the granulated material by the high-frequency current.

The blanketed electric welding procedure above described in general is customarily applied to the welding of seams, and the electrode progresses along the seam so that this method is not adapted for localized welds and stationary electrodes, or for repetitive welding except in so far as the high-frequency starting expedient above described contributes to such application.

It is therefore the main object of the present invention to provide an inexpensive, reliable, and adaptable method and apparatus for welding studs or projecting rods or bars to various metal surfaces, employing blanketed electric welding including the use of unbonded granular fusible welding material.

Other objects are to provide welding procedure and apparatus which will allow the stud or bar to act momentarily as welding current conductor, to form a pool or puddle of molten metal and hold the stud or bar in this position until the metal has solidified, to maintain welding conditions for a predetermined period of time, to push the molten or fused end of the stud into the molten surface metal before solidification starts, and to cause the stud to move slowly toward the surface during said predetermined period of time.

According to the present invention studs or bars are welded to metal work surfaces by positioning the stud transversely to the work surface with one end of the stud in spaced relation with respect to the work surface, surrounding juxtaposed portions of the stud and the metal surface, including the space between them, with unbonded granular fusible refractory mineral welding material, passing from the stud through the intervening material to the surface an electric welding current of sufficient magnitude to melt a portion of such mineral material as well as adjacent portions of the stud and surface, then pushing the stud toward this surface to bring the melted portions of the stud and surface together and to force outwardly molten metal to form a fillet or reinforcement around the adjacent portions of the stud and surface while forcing a protective covering layer of molten mineral material upon the outwardly-forced molten metal, and holding the stud and surface in this relation until the coalesced melted portions solidify. The time interval from the starting of the current to the pushing of the stud is automatically controlled to a preset period of delay. Hydraulic, electric, or mechanical timing devices may be employed. Preferably the stud is caused to move slowly toward the surface during the preset period of delay. Automatic feed of the studs from a magazine is contemplated.

Figure 6:
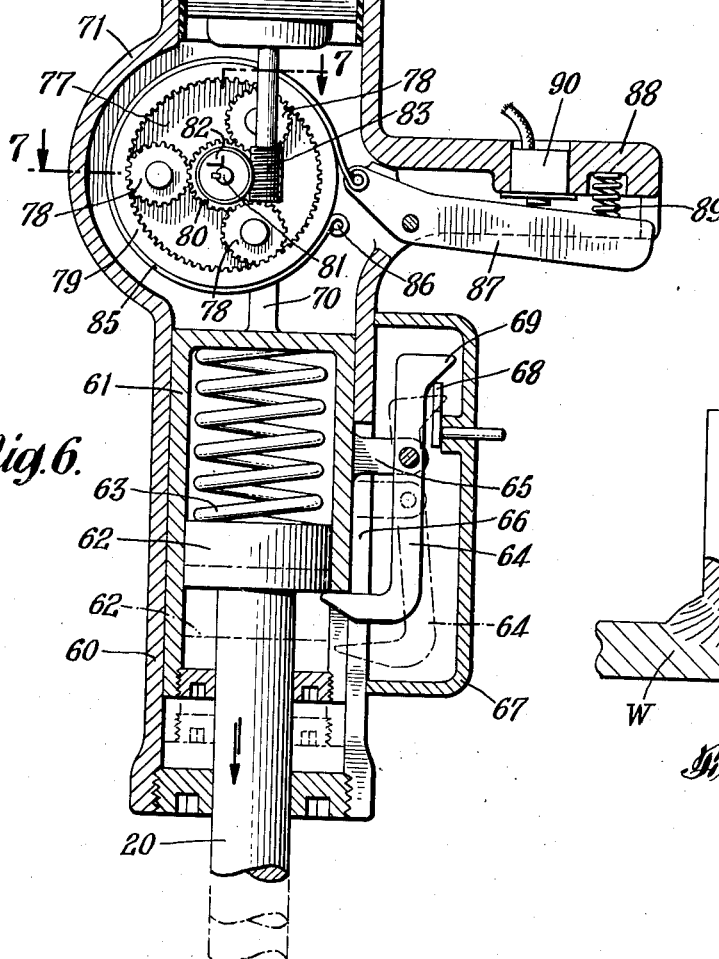
Figure 5:
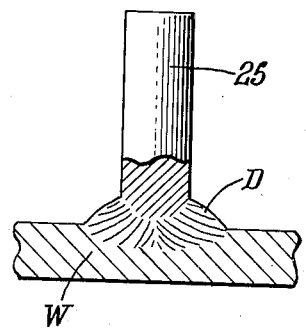

In the drawings:

Fig. 1 is a front elevation of a welding head according to the present invention, largely broken away and shown in vertical cross section to disclose the interior construction;

Figs. 2, 3, 4, and 5 are diagrams showing steps in the welding operation;

Fig. 6 is a modified form of driving mechanism for the welding head shown in Fig. 1; and Fig. 7 is a partial horizontal section taken along the line 7—7 of Fig. 6.

In the embodiment of the invention shown in Fig. 1, a casing 10 is provided, which is preferably manually portable, and provided with a gauging device comprising a rod 11 secured in a bracket 12 on the outside of the casing. A bracket 13 is slidable along the rod, and held in longitudinally adjusted position thereon by a set screw 14. The bracket 13 carries a ring 15 in which is slidably mounted a tube 16, longitudinally adjustably secured by a set screw 17. The tube 16 is adapted to engage the work W and cooperates with the rod 11 to hold the casing 10 in a stable upright position and adjustably spaced from the work surface. The tube 16 provides an enclosure for the welding zone and a receptacle to confine the granular welding material U, the top end of the tube being open for the introduction of such material.

Longitudinally slidable in the casing 10 is a plunger 18 having a reduced portion 19 and a stem 20 extending out of the lower end of the casing 10. The lower end of the stem 20 carries an insulated mounting 21 for a terminal 22 which receives electric welding current from a conductor 23. The terminal 22 carries a spring chuck 24 which grips one end of a preformed metal stud 25.

The stem 20 is urged downward, toward extended position, by a coil compression spring 26 interposed between an internal annular shoulder 27 in the casing, and a collar 28 mounted on the stem 20. A latch 29 pivotally mounted on the casing 10 near its lower end is adapted to engage the collar 28 and hold the stem 20 in retracted position.

The upper end of the plunger 18 is hollow, and forms an oil-containing cylinder 30, in which is slidably mounted a piston 31 having a rod 32 extending upward through a stuffing box 33. A coil compression spring 35 urges the piston 31 and its rod 32 toward the bottom end of the cylinder 30. A by-pass 36 connects the two ends of the cylinder 30, and is controlled by a threadedly mounted needle valve 37. The piston 31 contains an internal by-pass 38 controlled by a ball valve 39 urged into closed position by a spring 40.

The upper end of the piston rod 32 terminates in a handle 42 below which is mounted an adjusting nut 43, adapted to engage a latch 44 pivotally mounted on the upper end of the casing 10 and having a trigger 45. A coil compression spring 46 bearing against a casing handle 47, urges the trigger into cocked position. The casing handle 47 carries a push-button switch 51 for controlling the circuit to the terminal 22, and adapted to be closed by depressing the trigger 45.

The nut 43 is also adapted to engage the head 48 of a trip rod 49 slidably mounted in the bracket 12 and in a boss 50 on the casing 10. A coil compression spring 52 bearing against the bracket 12 and a collar 53 adjustably secured on the trip rod 49, urges the same upwardly, the lower end of the rod 49 upon downward movement being adapted to engage and trip the latch 29.

In operation, the handle 42 is pulled upward by hand to retract and pre-set the feeding mechanism. The rod 32 moves outward through the stuffing box 33, pulling the plunger 31 upward and compressing the spring 35. The oil above the plunger passes through the internal by-pass 38, the spring 40 yielding to let the displaced oil pass the ball 39, thence into the bottom of the cylinder 30. The valve mechanism 38, 39, 40, within the plunger 31, allows rapid upward motion of the plunger. Further upward movement of the rod 32 moves the cylinder 30, reduced portion 19 and stem 20 upward, compressing the spring 26. The latches 29 and 44 hold the assembly in the retracted position.

The stud 25 and the work W are prepared for welding as shown in Fig. 2, by the application of unbonded granular fusible mineral welding material U to cover the end of the stud and the opposed part of the work W. The material U may be supplied through a hose H. As a starting expedient, a small ball of steel wool may be inserted between the stud and the work. In lieu of the steel wool, iron powder may be mixed with the fusible granular material, for example 50 percent by weight. Of course, other starting expedients may be employed, as hereinbefore explained.

After the stud 25 has been placed in the holder or chuck 24, the feed mechanism has been pre-set, and the rod 11 has been adjusted to properly space the stud end initially from the area on the work W to which the stud is to be welded, the apparatus is positioned to locate the stud end over such area. Then, material U is introduced into the tube 16 and the stud is prepared for welding, whereupon the trigger 45 is depressed by the operator. This presses the button 51, closing the welding contactor and starting the welding action, the welding current of for example 900 to 1000 amperes passing through the conductor 23, terminal 22, chuck 24, stud 25, and the intervening material U, to the work W.

The starting expedient melts the granular material between the stud and the work, and this material in molten condition permits the use of higher current densities, so that the welding current generates an intense concentrated heat within the granular material and melts the adjacent portions of the stud and the work as well as a portion of the granular material.

As shown in Fig. 3, the molten material forms a pool or puddle B beneath the unmelted granular material U and around the juxtaposed molten portions of the stud 25 and the work W. The lower end of the stud becomes molten and rounded as at R, and an enlarged opposite portion of the work W becomes molten and swells and forms a pool or puddle P of molten metal.

At the same time that the button 51 is pressed, the trigger 45 releases the latch 44 from the nut 43 and the plunger 31 starts its downward travel. The oil in the cylinder 30 under the plunger 31 is trapped by the valve 39, but slowly escapes through the by-pass 36 controlled by the needle valve 37 to regulate the speed of descent.

After a short interval of for example from two to five seconds, preferably four seconds, the nut 43 contacts the head 48 of the trip rod 49 which is pushed downward to release the latch 29. The spring 26 then pushes the fused end of the stud into the molten metal on the work surface, at which time the operator releases the trigger 45, which releases the button 51 and opens the welding circuit.

When the stud is thus thrust downwardly, the molten end R is pushed through the pool B and into the puddle P, the molten material of the pool B being pushed aside or squeezed out. When the molten end R of the stud is pushed against and into the molten portion P of the surface, the molten stud end R and the pool or puddle P coalesce and fuse together, forming a smooth fillet or reinforcement F around the base of the stud, as shown in Fig. 4; and the molten material of the pool B forms a sub-surface layer L which floats as a liquid blanket over the molten weld metal.

As soon as the weld has cooled and solidified, the casing 10 is lifted bodily by its handles, the welded stud pulling out of the chuck 24, and the tube 16 being lifted along with the casing. The fused layer L solidifies on cooling and contracts and detaches itself, exposing the finished weld D having the clean smoothly tapered form shown in Fig. 5.

The embodiment of the invention described above serves to hold the stud stationary during the welding period, releasing it after a predetermined time has elapsed and plunging the fused end of the stud into the molten puddle of metal formed during the welding period. Preferably the stud is caused to descend slowly toward the molten metal of the surface W during the time interval of duration of the welding current, followed by the rapid thrust or push which drives the molten end of the stud into the molten metal of the surface W.

The modification shown in Figs. 6 and 7 is provided in order to achieve this slow descent of the stud member during the welding period. This modification utilizes a small series motor, driving the release mechanism through a planetary gear system, until at the end of a predetermined length of travel a release is tripped, which plunges the fused end of the stud into the welding puddle. By properly adjusting the welding current for the size stud employed and the adjustable timing cam on the device, the proper length welding period can be maintained. In order that the device may be readily reset to the starting position for a new weld, it is necessary that the feeding mechanism be reversible. This is provided by holding the ring gear stationary during the welding period, by tightening the ring gear restraining band through the action of the attached lever, and releasing the same, allowing the ring gear to rotate during the resetting period. The resetting is accomplished after inserting a new stud in the chuck by pressing the end of the stud against the surface of the workpiece.

With the gear arrangement shown, the driving worm attached to the motor rotates the worm gear and the center gear of the planetary system. With the ring gear stationary this results in rotation of the three intermediate gears attached to a single frame. Also attached to this frame is a gear enmeshed with the gear rack attached to the release and stud supporting mechanism. For example, the central and intermediate gears are of the same pitch diameter as drawn, and a reduction of 4 to 1 in driving speed is obtained between the central gear of the planetary system and the gear enmeshed with the rack. The system can be reversed with the central gear stationary if the ring gear is free to rotate, and this is accomplished as described above, by releasing the restraining band.

In the modified form shown in Figs. 6 and 7, a casing 60 is provided, which receives a plunger 61 in longitudinally slidable relation therein. The plunger 61 is hollow and in turn receives a longitudinally slidable piston 62 which is urged outwardly or downwardly by a coil compression spring 63. The piston 62 is retained within the plunger 61 by a latch 64 pivoted on an ear 65 extending laterally from the plunger 61 through a slot 66 in the casing 60.

The latch 64 is enclosed within a housing 67 attached to the casing 60. A cam 68 is pivoted within the housing 67, and engages a trip 69 on the upper end of the latch, to release the same when the plunger 61 moves downward. The cam 68 may be turned on its pivot to change the timing for tripping of the latch.

The plunger 61 has an upstanding stem 70 which projects upwardly into a gear box 71 formed in the upper part of the casing 60. The stem 70 is provided with a rack 75 (Fig. 7) meshing with a gear 76 secured to a frame 77 on which are journalled three planetary gears 78 meshing with an internal ring gear 79 and a central pinion 80. The pinion 80 is keyed on a shaft 81, to which is also keyed a worm wheel 82 meshing with a worm 83 on a shaft of a small series motor 84.

The periphery of the ring gear 79 is engaged by a restraining or brake band 85, having one end fixed on a pin 86 and the other end secured to a lever 87 pivoted in the casing near the casing handle 88. The lever 87 is urged outwardly by a spring 89 and the handle 88 carries a remote control switch 90 for the motor 84 and the welding current.

In the operation of the mechanism shown in Figs. 6 and 7, the welding operation is started by pressing lever 87 to close the switch 90 and to contract the band 85; thereupon the welding current flows through a circuit including the stud, the work and the mineral material that encloses the juxtaposed parts of the stud and work and the space between them. Simultaneously, the motor 84 is energized and drives the worm 83 and wheel 82, which drives the central pinion 80. The ring gear 79 is held stationary by the band 85, so that the planetary gears 78 cause rotation of the frame 77 and its gear 76 which, meshing with the rack 75, drives the stem 70 and the plunger 61 slowly downward.

As the plunger 61 descends, it carries the latch 64 with it, until the trip 69 is cammed inwardly enough to cause the latch 64 to release the piston 62. The position of the latch and the piston are shown in dotted lines at this point in Fig. 6. When the piston 62 is released, the spring 63 causes the stem 20 to be thrust downward with sufficient force to drive the fused end of the stud 25 into the molten metal on the work surface, as shown in Fig. 3.

While various embodiments of the invention have been described in sufficient detail to enable any one skilled in the art to practice the invention, nevertheless it is to be understood that the invention is not to be limited to the precise details disclosed. Instead it will be understood that the invention includes such modifications and embodiments of the broad ideas as fall within the scope of the subjoined claims.

Having thus described the invention, what we claim as new and desire to protect by Letters Patent of the United States is:

1. A method of welding a preformed metal stud or the like to a surface of a metal plate or the like, such method comprising initially holding said stud stationary and so as to space one end thereof from an area of said surface to which the stud is to be welded; enclosing said end of the stud, said area and the space between them with granular fusible mineral material; passing through a circuit including said end of said stud, said area and the adjoining mineral material an electric welding current of sufficient magnitude to fuse said end of said stud and the metal at said area and to melt such adjoining mineral material and form a liquid pool thereof around said fused end of said stud and such juxtaposed fused metal of said surface; and rapidly pushing said stud a sufficient distance toward said surface to thrust such fused end of said stud rapidly through such molten mineral material and into the fused metal upon said area, to coalesce the fused metal of such stud end and said area and to force fused metal outwardly around such stud end and form a reinforcing metal fillet around said stud end while forcing a covering layer of such molten mineral material upon such outwardly-forced fused metal to protect the latter from the atmosphere during the formation of said reinforcing fillet.

2. A method of welding a preformed metal stud or the like to a surface of a metal plate or the like, as claimed in claim 1, wherein said stud, before it is rapidly pushed toward said surface, is slowly advanced toward said surface while said electric welding current is passing through said circuit, and wherein said stud is released after the formation of said reinforcing fillet.

3. Apparatus for welding a preformed metal stud or the like to a surface of a metal plate or the like, which comprises the combination of a movable holder for initially holding a stud stationary and so as to space one end thereof from an area of said surface to which the stud is to be welded; retaining means adjacent said holder for retaining granular fusible mineral material in a position to enclose said end of the stud, said area and the space between them; means including an electric switch for passing through a circuit including said end of said stud, said area and said mineral material an electric welding current of sufficient magnitude to fuse said end of said stud and the metal at said area and to melt such adjoining mineral material and form a liquid layer thereof around and between said fused end of said stud and such juxtaposed fused metal of said surface; thrusting means applying pressure to said holder and automatically operable to rapidly push said holder and the stud held thereby toward said area; releasable latching means cooperating with said thrusting means and initially restraining the operation of said thrusting means when said switch is closed to start a stud welding operation; and latch-releasing means, comprising a latch-releasing element carried by said apparatus and moving continuously relatively to said holder for a predetermined interval of time after closing said switch, for releasing said latching means to render operable said thrusting means to rapidly push the fused end of said stud through such molten mineral material and into the fused metal upon said area to coalesce the fused metal of such stud end and said area and to force fused metal outwardly around such stud end and form a reinforcing metal fillet around said stud end while retaining a layer of such molten mineral material upon such outwardly-forced fused metal to protect the latter from the atmosphere during the formation of said fillet.

4. Apparatus as claimed in claim 3, in combination with advancing means operatively connected to said holder and energized at the instant said switch is closed to start a stud welding operation and actuated instantly upon closing said switch to initially slowly advance said holder and the stud held thereby toward said surface while said latching means continues to restrain the operation of said thrusting means.

5. In apparatus for welding a first member forming a fixed electrode of an electric welding circuit to a second member forming another electrode of said circuit, comprising a support, said second member being adapted to be mounted on said support and movable toward said first member, means mounted on said support for urging said second member toward said first member, and a latch on said support for retaining said second member against the action of said urging means, the improvement which comprises a timing element mounted on said support for movement toward said first member, means for moving said second member slowly toward said first member, and means whereby said latch is actuated by said timing element at the end of said slow movement to release said second member and permit said urging means to move said second member toward said first member.

6. In apparatus for welding a first member forming a fixed electrode of an electric welding circuit to a second member forming another electrode of said circuit, as claimed in claim 5, in which said second member and its urging means move with said timing element during said slow movement.

7. In apparatus for welding a first member forming a fixed electrode of an electric welding circuit to a second member forming another electrode of said circuit, as claimed in claim 5, in which said means for moving said timing element slowly toward said first member includes an escapement device for retarding the motion of said timing element.

8. Apparatus for welding a first member forming a fixed electrode of an electric welding circuit to a second member forming another electrode of said circuit, which comprises means for exerting pressure on said second member urging it toward said first member, a latch cooperating with said means for retaining said second member against said pressure, means for exerting a force against said second member while latched against said pressure, an escapement for said force to move said latched member slowly toward said first member, and a trip for engaging said latch for releasing said second member at the end of said slow motion to drive said second member toward said first member.

9. Method of welding a first member forming a fixed electrode of an electric welding circuit to a second member forming another electrode of said circuit, which comprises exerting pressure on said second member urging it toward said first member, preventing the movement of said second member by said pressure, exerting a force against said second member urging the latter toward said first member while preventing the movement of said second member by said pressure, causing escapement of said force to move said second member slowly toward said first member while continuing to prevent the movement of said second member by said pressure, and at the end of said slow motion releasing said pressure exerted against said second member to permit said pressure to drive said second member toward said first member.

10. A method of welding a metal stud or the like to a surface of a metal member, which comprises positioning the stud with its longitudinal axis substantially perpendicular to said surface and with one end of the stud opposite but spaced from a portion of said surface, enclosing such surface portion and the opposed end of said stud with refractory granular fusible welding material, passing an electric welding current from said stud through said material to said surface for a sufficient period of time to fuse at least a portion of said material and melt adjacent portions of said stud and surface, moving said stud slowly toward said surface during said time period, and at the expiration of said time period pushing said stud rapidly toward said surface to drive the molten end of the stud into the molten metal of the surface.

11. Apparatus for welding a metal stud or the like to a surface of a metal member, which comprises means for positioning the stud with its longitudinal axis substantially perpendicular to said surface and with one end of the stud opposite but spaced from a portion of said surface, means for enclosing such surface portion and the opposed end of said stud with refractory granular fusible welding material, means for passing an electric welding current from said stud through said material to said surface for a sufficient period of time to fuse at least a portion of said material and melt adjacent portions of said stud and surface, means for moving said stud slowly toward said surface during said time period, and thrusting means rendered operable at the expiration of said time period for pushing said stud rapidly toward said surface to drive the molten end of the stud into the molten metal of the surface.

JAMES M. KEIR.
EDWIN A. CLAPP.

REFERENCES CITED

The following references are of record in the file of this patent:

UNITED STATES PATENTS

| Number | Name | Date |
| --- | --- | --- |
| Re. 22,108 | Crecca | June 9, 1942 |
| 1,995,001 | Ito | Mar. 19, 1935 |
| 2,018,263 | Ito | Oct. 22, 1935 |
| 2,057,670 | Crecca et al. | Oct. 20, 1936 |
| 2,096,495 | Hogg | Oct. 19, 1937 |
| 2,110,832 | Hogg et al. | Mar. 8, 1938 |
| 2,115,707 | Crecca et al. | May 3, 1938 |
| 2,217,964 | Nelson | Oct. 15, 1940 |
| 2,256,480 | Hughes | Sept. 23, 1941 |
| 2,293,163 | Morris | Aug. 18, 1942 |
| 2,326,865 | Kennedy | Aug. 17, 1943 |
| 2,365,612 | White et al. | Dec. 19, 1944 |
| 2,367,257 | Baird | Jan. 16, 1945 |